US006476874B1

(12) United States Patent
Ito et al.

(10) Patent No.: US 6,476,874 B1
(45) Date of Patent: Nov. 5, 2002

(54) APPARATUS AND METHOD FOR COMBINING BACKGROUND IMAGES WITH MAIN IMAGES

(75) Inventors: Keiichi Ito; Taku Kihara; Hitoshi Nakamura, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/974,129

(22) Filed: Nov. 19, 1997

(30) Foreign Application Priority Data

Nov. 19, 1996 (JP) .............................................. 8-322168

(51) Int. Cl.[7] .................................................. H04N 9/74
(52) U.S. Cl. ........................ 348/586; 348/584; 348/585; 348/598
(58) Field of Search ............................ 348/36, 42, 218, 348/584–587, 589–592, 598; 352/85; 396/2, 3

(56) References Cited

U.S. PATENT DOCUMENTS

| 4,122,490 A | * | 10/1978 | Lish ........................... 358/592 |
| 4,386,363 A | * | 5/1983 | Morrison ..................... 348/587 |
| 4,393,394 A | * | 7/1983 | McCoy ........................ 348/587 |
| 5,500,684 A | * | 3/1996 | Uya .............................. 348/592 |
| 5,737,031 A | * | 4/1998 | Tzidon et al. ............... 348/587 |
| 5,886,747 A | * | 3/1999 | Tzidon et al. ............... 348/587 |
| 6,034,740 A | * | 3/2000 | Mitsui et al. ................ 348/592 |
| 6,072,537 A | * | 6/2000 | Gurner et al. .............. 348/586 |
| 6,072,933 A | * | 6/2000 | Green ........................... 386/46 |

FOREIGN PATENT DOCUMENTS

| GB | 2 305 051 A | 3/1997 |
| GB | 2 312 125 A | 10/1997 |
| WO | WO 97/03517 | 1/1997 |

OTHER PUBLICATIONS

Patent Abstracts of Japan, vol. 15, No. 157, p. 113, of JP03–29472 Feb. 7, 1991.
Patent Abstracts of Japan, vol. 15, No. 157, p. 113, of JP03–29473 Feb. 7, 1991.

* cited by examiner

Primary Examiner—Wendy R. Garber
Assistant Examiner—Mitchell White
(74) Attorney, Agent, or Firm—Frommer Lawrence & Haug LLP; William S. Frommer

(57) ABSTRACT

It is intended to enable main image data from a video camera and background image data recorded on a recording medium to be chromakey-combined with each other naturally at a low cost. When a video switcher chromakey-combines main image data that is produced by imaging with a video camera with background image data that is reproduced from a magnetic tape by a VTR, the main image data is chromakey-combined with the background image data such that the VTR is caused to perform a reproducing operation on the magnetic tape based on time codes that are stored in a control device as one of a pair of information and the operations of the video camera and a video camera stage are controlled based on camera control information as the other of the pair of information.

11 Claims, 6 Drawing Sheets

FIG.4

| FILE NAME | | | | | | | | | |
|---|---|---|---|---|---|---|---|---|---|
| TIME CODE | COLOR TEMPERATURE | OUTLINE EMPHASIS | GAMMA CORRECTION | FOCUS | ZOOM | IRIS | POSITION (X, Y) | DIRECTION |
| 00:00:00:00 | ○○ | ○○ | ○○ | ○○ | ○○ | ○○ | ○○ | ○○ |
| △△:△△:△△:△△ | ○○ | ○○ | ○○ | △△ | △△ | ○○ | ○○ | ○○ |
| ........ | ........ | ........ | ........ | ........ | ........ | ........ | ........ | ........ |
| ××:××:××:×× | ○○ | ○○ | ○○ | ○○ | ○○ | ○○ | ×× | ×× |

APPARATUS AND METHOD FOR COMBINING BACKGROUND IMAGES WITH MAIN IMAGES

BACKGROUND OF THE INVENTION

The present invention relates to an image combining apparatus, particularly of a kind suitable for composing main image information obtained by imaging with a video camera and background image information recorded on a recording medium.

The chromakey technique (also called "blue back composing technique") is a conventional image composing method for combining, for example, images that are taken separately into an image that looks as if it were taken with a single video camera apparatus. In the chromakey technique, an object (a person, or the like) to become a main image is photographed with, for instance, a blue or green screen used as a background, and chroma data (chromakey data) is extracted from thus-obtained main image data. The chromakey data is combined with background image data that has been obtained preliminarily by imaging as data of a background, and resulting data is output.

The image combining by the chromakey technique has a drawback that an object to become a main image need to be photographed by using a chromakey back. However, this technique is now commonly used because it enables easy, real-time combining even in a case where an object to photographed is moving.

However, the chromakey technique has a problem that a combined image is not natural because it is difficult to make, for instance, the position and direction and the focus and zoom settings of a video camera when an object to become a main image is photographed completely equal to those when a background image is taken.

In view of the above, recently a system called a virtual studio has been proposed in which a background image is generated by computer graphics (CG). In this system, main image data of a main image taken with a video camera is combined with background data that is generated by computer graphics by the chromakey technique. A natural combined image can be obtained in this case because the background image data that is generated by computer graphics can be changed in accordance with the movement of the video camera.

This system has an additional advantage that it is not necessary to prepare a studio set etc. for imaging a background image because background data can be generated by a computer apparatus or the like.

However, to chromakey-combining main image data from a video camera with background data generated by computer graphics, three-dimensional computer graphics data needs to have three-dimensional data. There is a problem that the generation of three-dimensional data requires considerable cost and labor.

There is another problem that background image data other than that generated by computer graphics cannot be used as background image data to be chromakey-combined with main image data from a video camera.

SUMMARY OF THE INVENTION

The present invention has been made in view of the above problems, and an object of the invention is therefore to provide an image combining apparatus which can combine, naturally at a low cost, main image data from a video camera with background image data that has already been obtained by imaging.

To attain the above object, the invention provides an imaging system comprising imaging means comprising a camera stage capable of self movement and a video camera mounted on the camera stage; imaging operation control means for controlling an imaging operation of the imaging means; recording/reproducing means for recording, onto a recording medium, first image information that is produced by imaging with the imaging means and imaging control information indicating an operation control state of the imaging means at a time when the first image information is produced, and for reproducing the first image information that is recorded on the recording medium, the imaging control information being recorded onto the recording medium so as to be correlated with the first imaging information; combining means for combining second image information from the imaging means with the first image information from the recording/reproducing means; and control means for controlling the imaging means, the imaging operation control means, the recording/reproducing means, and the combining means, wherein the control means causes the recording/reproducing means to reproduce the first imaging information and the imaging control information that is correlated with the first imaging information and controls the imaging operation of the imaging means via the imaging operation control means based on the imaging control information, whereby the second imaging information that is output from the imaging means and the first imaging information that is reproduced by the recording/reproducing means are input to the combining means and combined there with each other.

In the above image system, the imaging control information may include camera setting information for controlling an imaging operation of the video camera and camera position information for controlling a movement operation of the camera stage.

The camera setting information may be information relating to color temperature.

The control means may control the camera stage based on the camera position information.

The recording/reproducing means may comprise first recording/reproducing means for recording the first imaging information and time information thereof onto a same, first recording medium, and imaging control information storing means for storing the imaging control information in a second recording medium so that it is correlated with the time information recorded on the first recording medium.

The imaging control information storing means may be able to store a plurality of time information and a plurality of imaging control information for each scene.

The combining means may combine the second image information with the first image information based on a chromakey.

The imaging means may comprise first and second camera apparatuses, and the imaging control information may include information for both of the first and second camera apparatuses.

According to another aspect, the invention provides an image combining method comprising the steps of producing first image information by imaging with imaging means that comprises a self-movable camera stage and a video camera mounted on the camera stage based on imaging control information supplied from control means; recording the first image information in recording/reproducing means; recording the imaging control information so that it is correlated with the first image information; controlling the imaging means and the recording/reproducing means based on the imaging control information so that second imaging information is output from the imaging means and the first imaging information is output from the recording/reproducing means; and combining the first image information and second image information with each other.

In the above image combining method, the imaging control information may include camera setting information for controlling an imaging operation of the video camera and camera position information for controlling a movement operation of the camera stage.

In the combining step, the first image information and the second image information may be combined with each other based on a chromakey.

BRIEF DESCRIPTION OF THE DRAWINGS

FIG. 4 shows an example of camera control information to be stored in a RAM 6a;

DETAILED DESCRIPTION OF THE PREFERRED EMBODIMENTS

Figure 1:
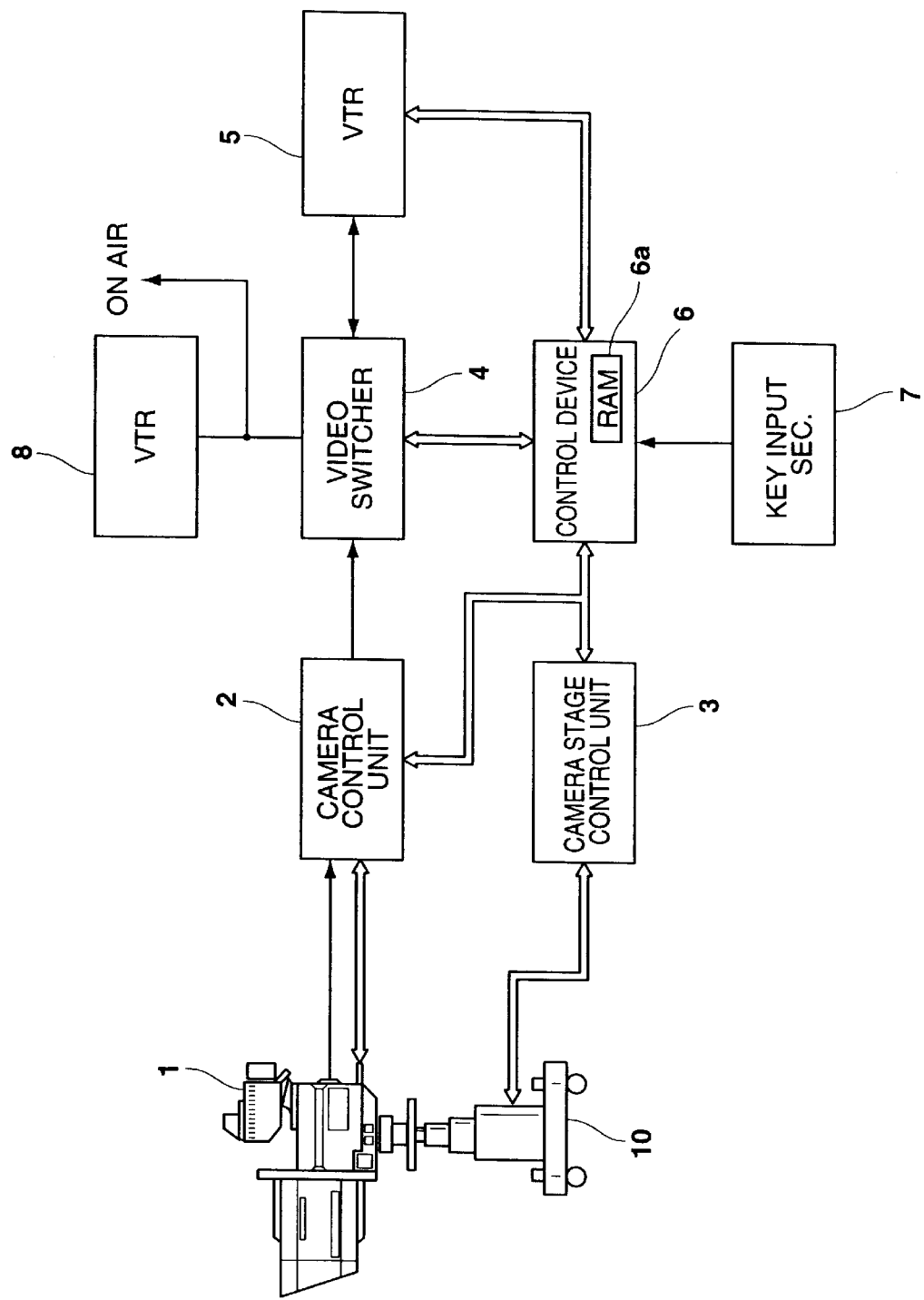
FIG. 1 shows an exemplary configuration of an image combining apparatus according to a first embodiment of the present invention.

FIG. 1 shows an exemplary configuration of an image combining apparatus according to an embodiment of the present invention.

In FIG. 1, a video camera 1 consists of a CCD (charge coupled device) camera and other components. For example, a camera control unit 2 on/off-controls a imaging operation and controls setting of various parameters of a color temperature correction, a gamma correction, white balancing, etc. and imaging-lens-related adjustments such as zooming, focusing, and an iris adjustment.

The video camera 1 is fixed on a video camera stage 10 (hereinafter referred to as "camera stage"), which, for example, can move around a studio. A camera stage control unit 3 controls the stop position of the camera stage 10 and the direction and the angle of the video camera 1 which is mounted on the camera stage 10.

The camera control unit 2 interfaces between the video camera 1 and the video switcher 4 and a control device 6. For example, in outputting image data obtained by the video camera 1 by imaging to the video switcher 4, the camera control unit 2 on/off-controls the video camera 1 and sets various parameters of the video camera 1 based on camera setting information that is supplied from the control device 6 at this time.

Examples of the camera setting information that is supplied from the control device 6 are color temperature correction data, gamma correction data, and white balancing data for the video camera 1 and zoom data, focus data, and iris data for the imaging lens.

The camera stage control unit 3 interfaces between the camera stage 10 and the control device 6. For example, when imaging is performed with the video camera 1, the camera stage control unit 3 controls the camera stage 10 based on camera position information that is supplied from the control device 6 at this time.

Examples of the camera position information that is supplied from the control device 6 are position data indicating a position (X, Y) with respect to the origin (0, 0) in the studio, and direction data indicating the right/left direction of the video camera 1 that is fixed to the camera stage 10 and angle data indicating an angle in a vertical plane of the video camera 1.

In this embodiment, the camera setting information and the camera position information that are supplied from the control device are together called camera control information.

For example, the video switcher 4 is so constructed as to be able to perform various kinds of scene change such as outputting a plurality of received image data while switching those image data instantaneously or gradually, and various kinds of image combining such as chromakey combining and superimposing in which characters are superimposed on an image. For example, image data as processed or composed by the video switcher 4 is supplied to a VTR 8 (indicated by a broken line) and recorded therein onto a magnetic recording medium such as a magnetic tape, or is directly aired.

Various operations of a VTR 5, such as an on/off operation, are controlled by the control device 6. For example, image data supplied from the video switcher 4 can be recorded onto a magnetic tape or the like and image data recorded on the magnetic tape or the like can be reproduced.

The control device 6, which is a computer device, for instance, controls the entire image combining apparatus in accordance with a manipulation on the key input section 7. For example, in the case of recording image data obtained by the video camera 1 by imaging onto the VTR 5, the control device 6 controls on/off operations of the video camera 1 and the VTR 5 and holds camera control information that has been sent to the camera control unit 2 and the camera stage control unit 3. The control device 6 stores the camera control information in, for instance, a built-in RAM 6a so that it is correlated with time codes that are absolute position information of the magnetic tape on which image data is recorded.

In the case of reproducing image data that is recorded in the VTR 5, the control device 6 controls the VTR 5 so that image data recorded on the magnetic tape is reproduced. At the same time, the control device 6 reads out, from the RAM 6a, camera control information corresponding to the image data that is reproduced from the VTR 5 and outputs the read-out camera control information to the camera control unit 2 and the camera stage control unit 3 so as to be correlated with time codes of the reproduced image data.

Figure 2:
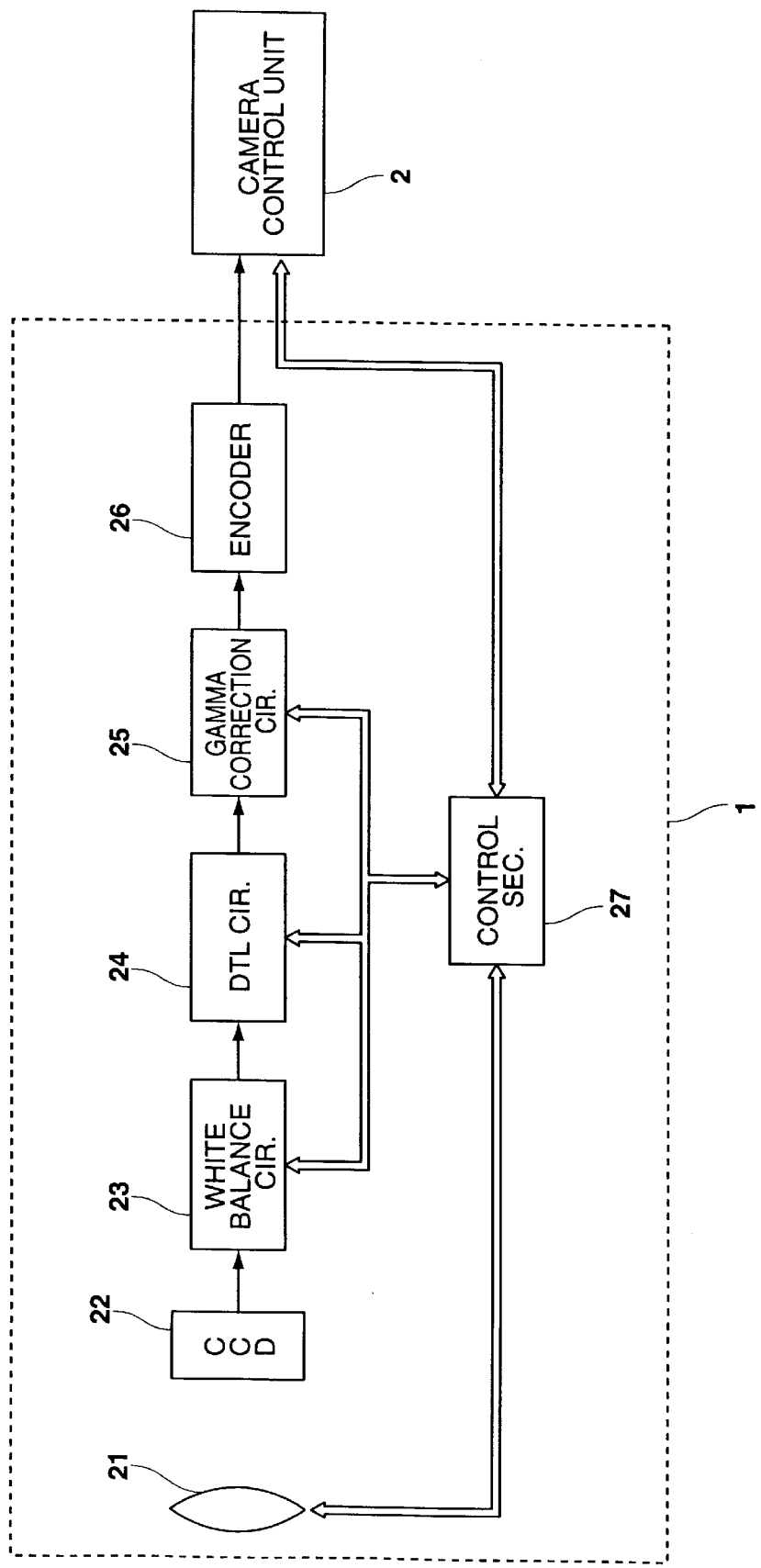
FIG. 2 is a block diagram showing an exemplary configuration of a video camera 1.

FIG. 2 is a block diagram of the video camera 1 that constitutes the above-described image combining apparatus. The operation of the video camera 1 will be described with reference to FIG. 2.

In the video camera 1 shown in FIG. 2, imaging light that is input through the lens 21 is converted by a CCD camera section 22 into imaging data, which is input to a white balance circuit 23. The white balance circuit 23 adjusts white balance of the imaging data and outputs resulting imaging data to a detail circuit (hereinafter referred to as "DTL circuit") 24. The DTL circuit 24 adds an outline signal for emphasizing the outline to the received imaging data and outputs resulting imaging data to a gamma correction circuit

25. The gamma correction circuit 25 performs gamma correction on the imaging data and outputs resulting imaging data to an encoder 26. The encoder 26 encodes the received imaging data and outputs, as image data, resulting imaging data to the camera control unit 2 of the image combining apparatus.

A control section 27 controls the entire video camera 1, as well as adjusts zooming, focusing, etc. of the lens 21 and sets various parameters of the white balance circuit 23, the DTL circuit 24, and the gamma correction circuit 25.

Figure 3:
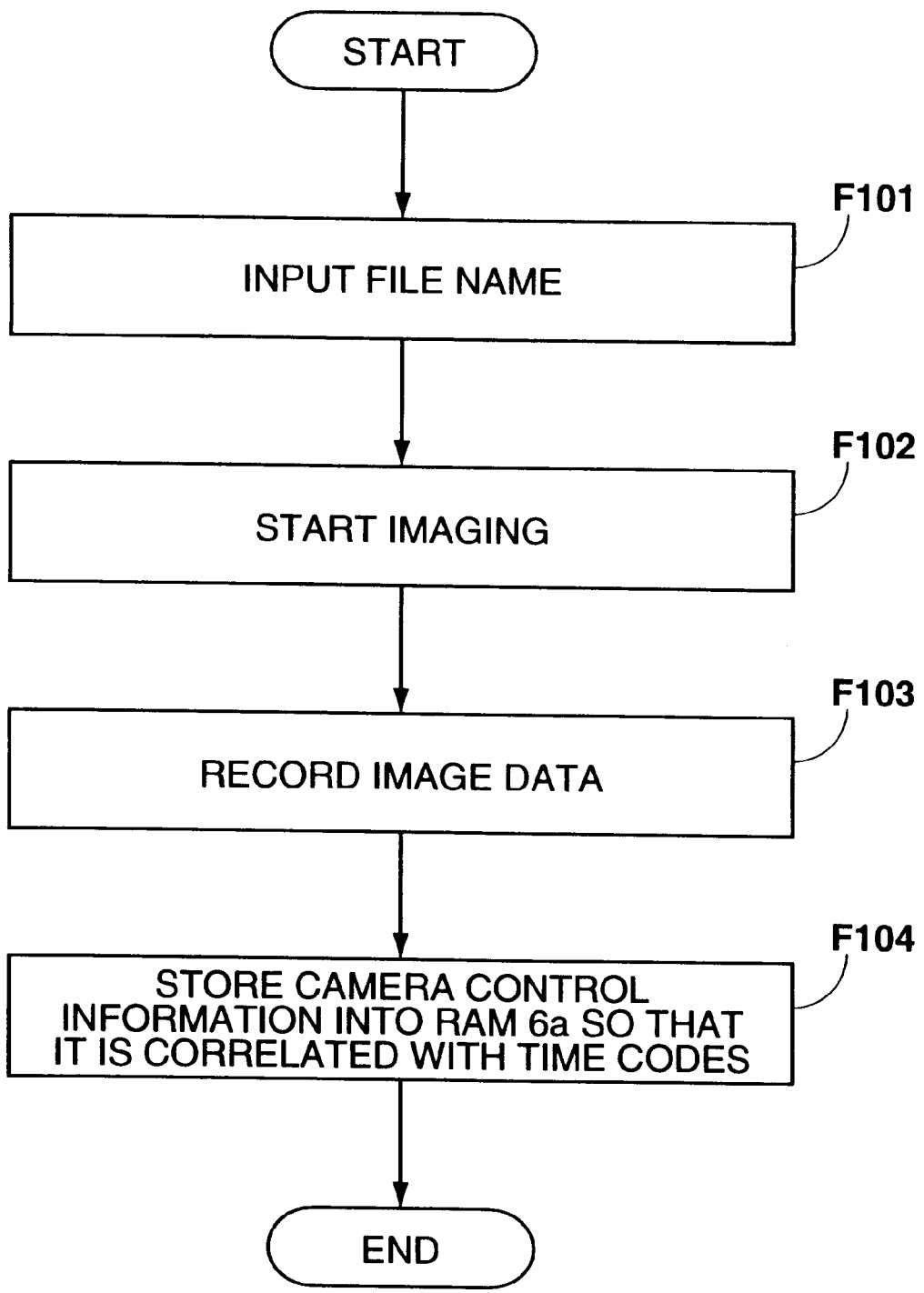
FIG. 3 is a flowchart showing a process to be executed by the video camera 1 in imaging a background.
Figure 5:
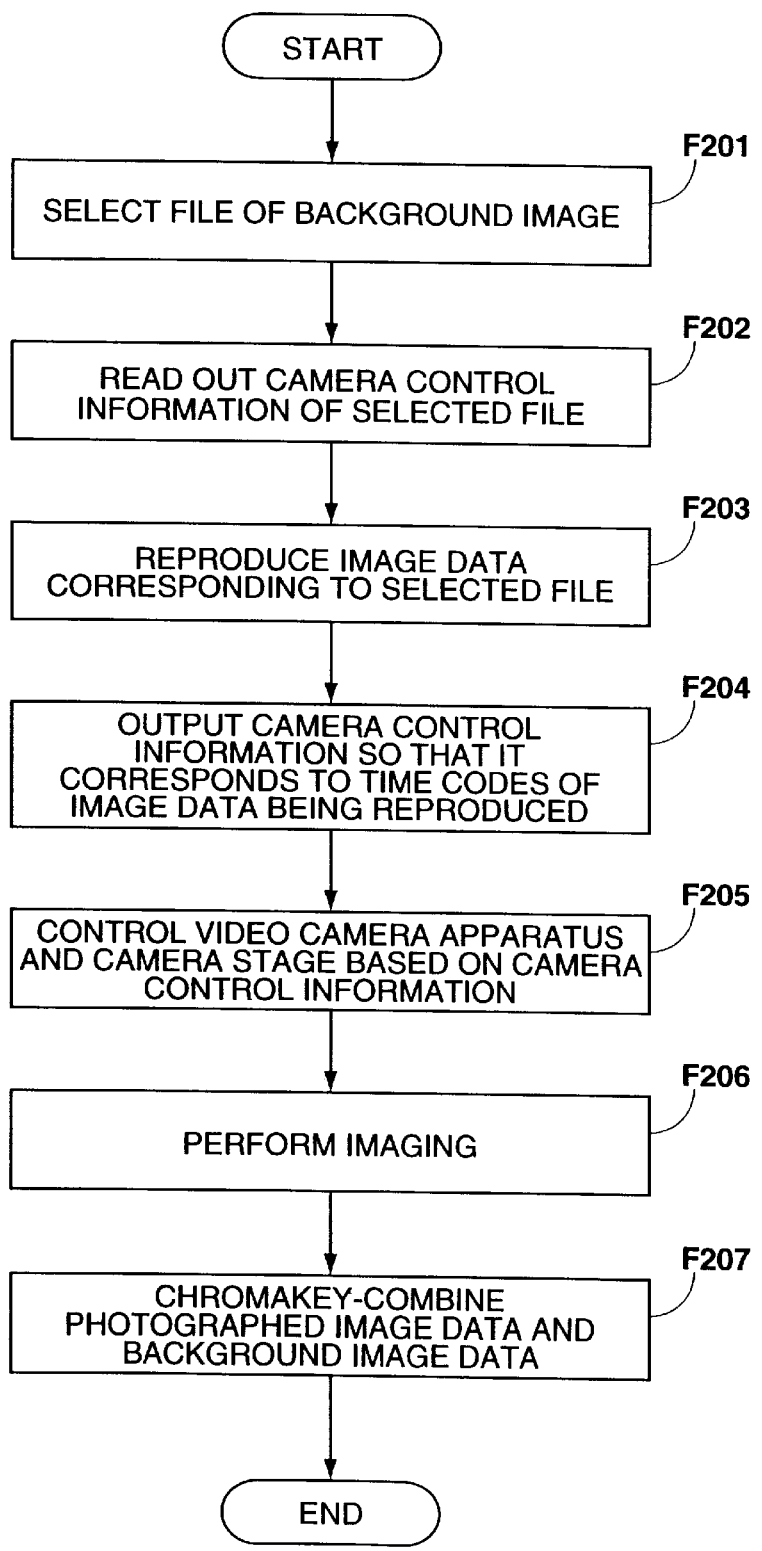
FIG. 5 is a flowchart showing a process to be executed in chromakey-combining main image data with background image data.

Next, with reference to FIGS. 3–5, a process to be executed by the above-described image combining apparatus of the embodiment in chromakey-combining an image taken by the video camera 1 with an image recorded in the VTR 5.

In the case of chromakey-combining an image taken by the video camera 1 with an image recorded in the VTR 5, it is necessary to record an image of a background program set in the VTR 5. Therefore, first, a process for recording a background program set in the VTR 5 will be described with reference to a flowchart of FIG. 3.

To record a background image in the VTR 5, a file name is input through the key input section 7 to enable later recognition of a photographed image of a program set (F101). Then, a background program set is prepared in a studio, for instance, and photographed in a state that there are no performers etc., to produce its image. At this time, the control of a imaging operation and setting of various parameters of the video camera 1 can be made through the key input section 7, for instance. The video camera 1 and the camera stage 10 are controlled based on input information sent from the key input section 7. Image data obtained by imaging under certain conditions are recorded onto a magnetic tape, for instance, of the VTR 5 via the camera control unit 2 and the video switcher 4 (F102, F103). The background image recorded in the VTR 5 may be either a moving image or a still image.

At this time, the control device 6 holds, as camera control information, the input information that has been input through the key input section 7, and stores the camera control information into the RAM 6a with the previously input file name so that it is correlated with time codes that are supplied from the VTR 5 (F104). The time codes represent absolute positions on the magnetic tape or the like of the VTR 5 on which the background data is recorded, in the form of "hours, minutes, seconds, and frame."

Alternatively, the camera control information may be stored in the RAM 6a so as to be correlated with relative position information of the magnetic tape that is obtained from a control signal of the VTR 5.

FIG. 4 shows an example of camera control information to be stored in the RAM 6a with a certain file name. Time codes that are supplied from the VTR 5 and camera control information of image data that is recorded with those time codes are stored in the RAM 6a so that they are correlated with each other. That is, various parameters such as color temperature correction data, outline emphasis data, and gamma correction data, adjustment data of focusing, zooming, an iris adjustment, etc., position data and direction data, and other data are stored in the RAM 6a so as to be correlated with time codes.

Therefore, when, for example, the zoom magnification or focusing of the video camera 1 is adjusted during imaging, or the imaging position or direction of the video camera 1 is changed by moving the camera stage 10 is adjusted during imaging, time codes of a magnetic tape on which image data obtained under the adjusted conditions is recorded and adjusted zoom data, focus data, position data, direction data, etc. are stored so that they are correlated with each other.

Next, a process of chromakey-combining a main image with a background image that is recorded in the VTR 5 while imaging a performer etc. for the main image with the video camera 1 will be described with reference to a flowchart of FIG. 5.

In this process, first, a file of a background to be chromakey-combined with a main image that will be obtained by imaging is selected through the key input device 7 (F201). After the file selection, the control device 6 reads out camera information corresponding to the selected file from the RAM 6a (F202) and, at the same time, controls the VTR 5 so that image data corresponding to the selected file is reproduced (F203). Then, the control device 6 outputs, to the camera control unit 2 and the camera stage control unit 3, camera control information so that it corresponds to time codes of image data that is being reproduced from the VTR 5 (F204).

At this time, as described above, the camera control unit 2 is supplied with, as camera setting information, various parameters such as color temperature correction data, outline emphasis data, and gamma correction data, as well as focus data, zoom data, iris data, etc. Based on the camera setting information, the camera control unit 2 controls various parameters of the video camera 1 and zooming and focusing of the imaging lens 21.

On the other h and, the camera s tag e control unit 3 is supplied, as camera position information, with imaging position data and direction data. Based on the camera position information, the camera stage control unit 3 controls the camera stage 10 so that it is located at a proper position and is properly directed (F205).

That is, in this case, the video camera 1 and the camera stage 10 are controlled so as to establish the same imaging conditions as at the time when the background image data that is now reproduced from the VTR 5 was produced by imaging. If a performer plays before a background of a blue or green screen (chromakey back) in this state, main data that is obtained by imaging under the same conditions as the reproduced background image data was is supplied to the video switcher 4 via the camera control unit 2 (F206). The video switcher 4 chromakey-combines the thus-produced main image data with the background image data, and a combined image is output to the VTR 8 or aired (F207).

As described above, in the image combining apparatus of the embodiment, in the case of chromakey-combining main image data that is supplied from the video camera 1 with background image data that is recorded in the VTR 5 and outputting combined image data, the video camera 1 and the camera stage 10 are controlled so as to be rendered under the same conditions as at the time when the background image data now being reproduced from the VTR 5 was produced by imaging. Therefore, the main image and the background image are chromakey-combined into a natural image.

That is, various parameters of the video camera 1 and the position and the direction of the camera stage 10 when a person for main image data is photographed under the same conditions as at a time when background image data was produced by imaging. For example, when the picture frame of reproduced background image data changes as a result of execution of a zooming function, the zooming of the video camera 1 that is imaging a person for a main image is changed accordingly and hence the picture frame is changed in a similar manner. When focusing of reproduced background image data changes, the focusing of the video camera 1 is changed in a similar manner.

Further, when background image data of a program set as a background is recorded on a magnetic tape, camera control information at that time is stored into the control device 6. Therefore, the background image recorded on the magnetic tape can be used many times; it is not necessary to manufacture the same program set again and again.

In the embodiment, the camera control information to be used for control of the video camera 1 and the camera stage 10 is stored in the RAM 6a of the control device 6. Alternatively, for example, a RAM may be provided in each of the camera control unit 2 and the camera stage control unit 3 in which case the camera setting information of the camera control information is stored in the RAM of the camera control unit 2 and the camera position information is stored in the RAM of the camera stage control unit 3.

Figure 6:
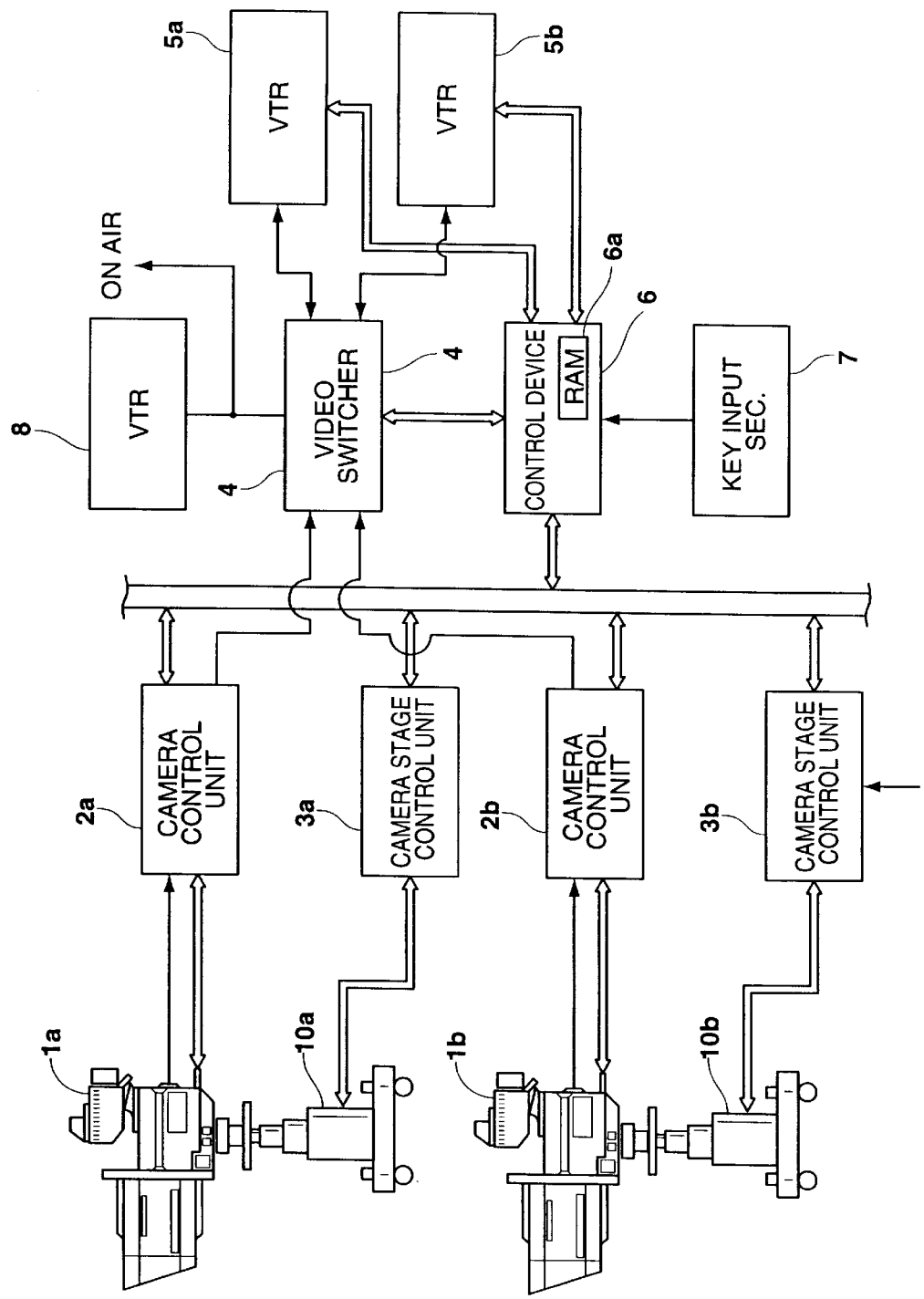
FIG. 6 shows an exemplary configuration of an image combining apparatus according to a second embodiment of the invention.

Next, FIG. 6 shows an exemplary configuration of an image combining apparatus according to another embodiment of the invention that uses a plurality of video cameras. The blocks in FIG. 6 that are the same as in FIG. 1 are given the same reference numerals and descriptions therefor will be omitted.

In the image combining apparatus of FIG. 6, two video cameras 1a and 1b, for instance, are fixed on camera stages 10a and 10b. There are provided camera control units 2a and 2b for controlling the video cameras 1a and 1b, respectively, and camera stage control units 3a and 3b for controlling the camera stages 10a and 10b, respectively.

VTRs 5a and 5b are provided that have magnetic tapes on which background image data to be combined with main image data produced by imaging with the video cameras 1a and 1b are to be recorded, respectively.

In the above-configured image combining apparatus, in the case of chromakey-combining main image data that is produced by imaging with the video camera 1a with background image data that is reproduced from the VTR 5a, the camera number of the video camera 1a and the VTR number of the VTR 5a are input and a file name of background image data to be chromakey-combined with main image data is selected through the key input section 7, for instance.

In this case, the control device 6 reads out camera control information that is stored in advance in the RAM 6a and corresponds to the background data to be reproduced from the VTR 5a, and supplies the camera control information to the camera control unit 2a and the camera stage control unit 3a, to thereby control the video camera 1a and the camera stage 10a are rendered under the same imaging conditions as at the time when the background image data that is now reproduced from the VTR 5a was produced by imaging.

An image obtained by chromakey-combining the main image data that is produced by imaging with the video camera 1a with the background image data that is reproduced from the VTR 5a is output from the video switcher 4 to the VTR 8 or aired.

Further, the image combining apparatus of this embodiment is so constructed that, for example, main image data that is produced by imaging with the video camera 1b can be chromakey-combined, in this state, with background image data that is recorded on a magnetic tape of the VTR 5b. In this case, camera control information corresponding to the background image data reproduced by the VTR 5b is read out from the RAM 6a, and based on the camera control information the video camera 1b and the camera stage 10b are controlled so as to be rendered under the same imaging conditions as at the time when the background image data that is now reproduced from the VTR 5b was produced by imaging.

Thus, in the state that the image that is being produced by chromakey-combining the main image data from the video camera 1a with the background image data from the VTR 5a is being output from the video switcher 4, it can be switched on a real-time basis to the image that is produced by chromakey-combining the main image data from the video camera 1b with the background image data from the VTR 5b.

Incidentally, the above-described image combining apparatus of the embodiment can also be provided with a function of processing (modifying) background image data that is reproduced from the VTR 5 in accordance with movement of the video camera 1 that is effected by an external manipulation on the video camera 1 in a state that a main image is being taken by the video camera 1.

That is, for example, when the zooming function of the video camera 1 is changed while main image data is being produced by imaging with the video camera 1, background data that is reproduced from the VTR 5 is enlarged or reduced accordingly. When the video camera 1 is turned rightward, background image data that is reproduced from the VTR 5 may be modified so as to reflect such a rightward turn.

In the case of adding the function of modifying background image data, for example, part of an image that is produced by chromakey combining in the video switcher 4 may be used after enlarging it because background image data recorded in the VTR 5 has a limit in size. The image quality of background image is lowered when enlarged background image is used. It is therefore more effective to take a background image with a high-resolution video camera or the like in advance.

As described above, in the image combining apparatus of the invention, when the image combining means combines image information that is produced by imaging with image information that is reproduced from a recording medium, recording position information and imaging control information that are stored as a pair of information are used so that a reproducing operation is performed on the recording medium based on the recording position information and the imaging operation is controlled based on the imaging control information, and image information obtained by imaging in this state with reproduced image information. Therefore, the imaging conditions can be made the same as those at the time when the image information that is now reproduced was produced, and hence a natural combined image that will not cause any sense of incongruity can be obtained at a low cost.

What is claimed is:

1. An imaging system comprising:

imaging means including a camera stage capable of self movement and a video camera mounted on the camera stage, said imaging means generates background image information and main image information;

imaging operation control means for controlling operational movements of the imaging means by generating imaging control information specifying the operational movements of said imaging means as background image information is generated;

recording/reproducing means for recording on a recording medium background image information, and for generating reproduced background image information;

combining means for combining said main image information and said reproduced background image information; and system control means for controlling the imaging means, the imaging operation control means, the recording/ reproducing means, and the combining means, and for storing said imaging control information in an internal memory, wherein the system control means controls the recording/reproducing means to correlate the reproduced background image information and the stored imaging control information, and controls the imaging means to generate main image information based upon the stored imaging control information, and wherein the main image information and the reproduced background image information are input into the combining means.

2. The imaging system according to claim 1, wherein the imaging control information includes camera setting information for controlling an imaging operation of the video camera and camera position information for controlling a movement operation of the camera stage.

3. The imaging system according to claim 2, wherein the camera setting information is information relating to color temperature.

4. The imaging system according to claim 2, wherein the system control means controls the camera stage based on the camera position information.

5. The imaging system according to claim 1, wherein the recording/reproducing means comprises background recording/reproducing means for recording the background image information and time information thereof onto the same, first recording medium, and imaging control information storing means for storing the imaging control information in a second recording medium, so that it is correlated with the time information recorded on the first recording medium.

6. The imaging system according to claim 5, wherein the system control memory can store a plurality of time information and a plurality of imaging control information for each scene.

7. The imaging system according to claim 1, wherein the combining means combines the main image information with the background image information based on chromakey.

8. The imaging system according to claim 1, wherein the imaging means comprises first and second camera apparatuses, and wherein the imaging control information includes information for both of the first and second camera apparatuses.

9. An imaging method comprising the steps of:

generating background image information and main image information via imaging means, said imaging means includes a self-movable camera stage and a video camera mounted on the camera stage;

recording the background image information on recording/reproducing means;

recording in an internal memory imaging control information specifying the operational movements of said imaging means as background image information is generated;

controlling the operational movements of the imaging means and the recording/reproducing means based on the imaging control information so that main image information is output from the imaging means and the background image information is output from the recording/reproducing means;

combining the background image information and main image information with each other; and controlling the imaging means, the recording steps and the controlling steps to correlate the reproduced background image information and the stored imaging control information; and controlling the imaging means to generate main image information based upon the stored imaging control information.

10. The image combining method according to claim 9, wherein the imaging control information includes camera setting information for controlling an imaging operation of the video camera and camera position information for controlling a movement operation of the camera stage.

11. The imaging combining method according to claim 9, wherein the step of combining combines the background image information and the main image information with each other based on chromakey.

* * * * *